Feb. 2, 1932.  A. SHAFFER  1,843,743

VARIABLE TORQUE CONTROL FOR CABLE REEL MOTORS

Filed Dec. 20, 1930

Inventor:
Arthur Shaffer,
by Charles E. Tullar
His Attorney.

Patented Feb. 2, 1932

1,843,743

UNITED STATES PATENT OFFICE

ARTHUR SHAFFER, OF WEST FRANKFORT, ILLINOIS, ASSIGNOR TO GENERAL ELECTRIC COMPANY, A CORPORATION OF NEW YORK

VARIABLE TORQUE CONTROL FOR CABLE REEL MOTORS

Application filed December 20, 1930. Serial No. 503,787.

My invention relates to the control of electric cable reels such as commonly used on electric motor driven mining locomotives of the gathering type.

When the gathering locomotive is operated in mining rooms or other places unprovided with the usual overhead trolley, the end of the power cable carried on the cable reel is connected by a cable hook to the nearest available trolley wire to supply current to the driving motor of the locomotive. As the locomotive moves away or towards the trolley wire connection, the power cable then must be payed out or taken in by means of the cable reel. To produce this result a small electric motor is arranged to be continuously energized and connected to exert a torque on the cable reel. Thus the cable reel torque motor acts as a brake when the power cable is payed out and functions after the manner of a spring of infinite length to maintain a reeling in torque on the cable reel when the direction of operation of the mining locomotive is reversed.

When the reeling in torque of the cable reel motor is made sufficient to hold the cable taut so as to avoid the possibility of being run over by the mining locomotive, then an excessive braking effect is obtained during the paying out of the cable. This causes wear and tear on the cable and guide rollers provided therefor as well as excessive wear and tear on the cable reel mechanism itself.

In accordance with the present invention these difficulties are overcome by varying the torque of the cable reel motor in accordance with the direction of movement of the mining locomotive. Thus when the mining locomotive is moving in the direction requiring reeling in the power cable, the torque of the cable reel motor is materially increased so as to insure that the cable is held taut to avoid being run over by the locomotive. When the locomotive is operated in the direction to pay out the power cable, the torque of the cable reel motor is reduced so as to permit freer running of the cable and thereby avoid excessive wear and tear thereon.

In the preferred form of the invention, a resistor is connected in circuit with the torque motor for the cable reel and contact mechanism is provided on the reversing controller of the mining locomotive so as to insert this resistance in the torque motor circuit when the locomotive is operated in the direction to pay out the power cable and to short circuit a portion of the resistor when the locomotive is operated in the direction to reel in the power cable.

Figure 1:
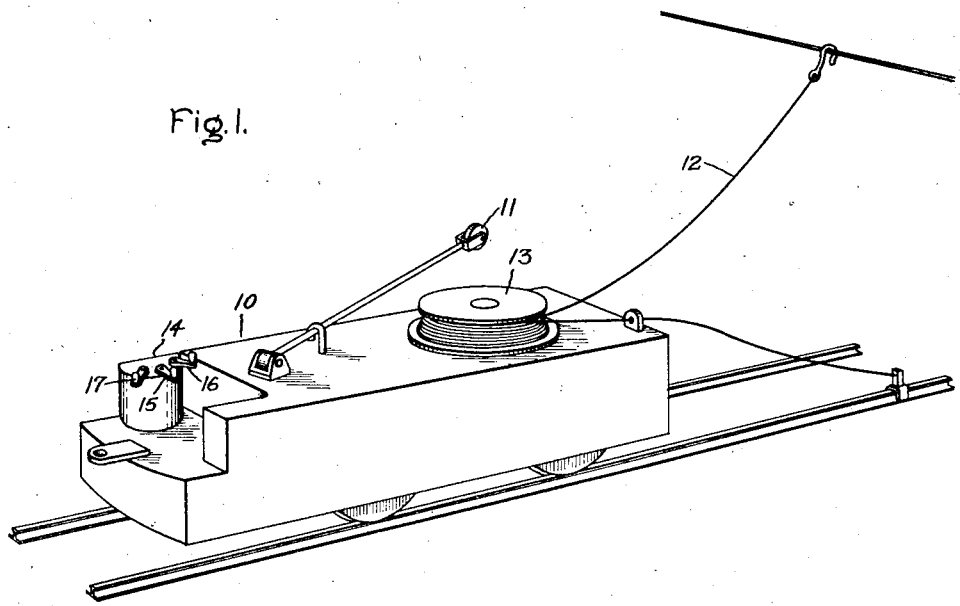
Figure 2:
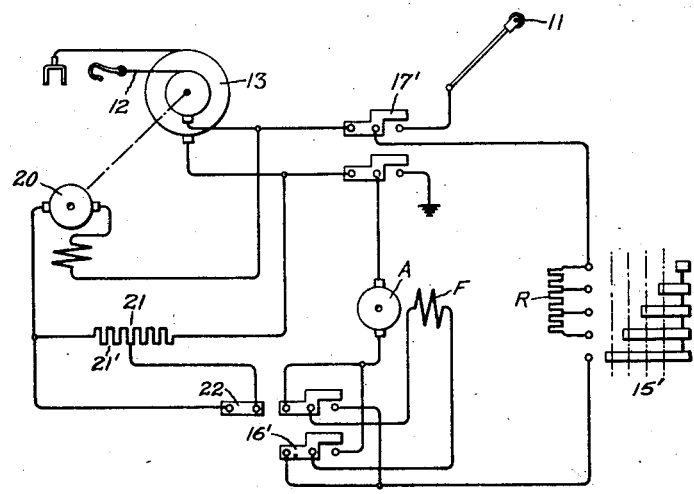

In the accompanying drawings Fig. 1 shows the general arrangement of a mining locomotive provided with an electric cable reel and Fig. 2 is a circuit diagram showing schematically the manner in which the present invention may be applied to vary the torque of the cable reel motor in accordance with the direction of operation of the locomotive.

In Fig. 1 the mining locomotive 10 is shown as of the conventional type provided with the trolley 11 for supplying power to the driving motors of the locomotive in places where an overhead trolley wire is available and having the cable power conductor 12 wound on the cable reel 13 for use in gathering service where there is no overhead trolley. A suitable controller 14 is provided for controlling the operation of the mining locomotive. This controller is shown as provided with the starting and accelerating controller handle 15, the reversing controller handle 16, and the transfer controller handle 17.

As indicated diagrammatically in Fig. 2 the starting and accelerating controller 15' is arranged to complete the energizing circuit for the driving motor of the locomotive having the armature A and the field winding F. Controller 15' also varies step by step the accelerating resistor R. The reversing controller 16' reverses the field winding F with respect to the armature A and thereby determines the direction of operation of the mining locomotive 10. The changeover controller 17' establishes connection so as to energize the locomotive driving motor either from the trolley 11 or through the power cable 12.

The cable reel 13 is provided with the torque motor 20 for controlling the paying out and the reeling in of the cable 12. Motor 20 is shown as of the series type and permanently connected so as to be energized whenever power is supplied to the power cable 12. The torque regulating resistor 21 is connected in series circuit with the motor 20.

In accordance with the present invention an auxiliary contact 22 is provided on the reversing controller 16' for controlling the short circuiting of the portion 21' of the torque regulating resistor. The arrangement of contact 22 is such that when the reversing controller 16' is operated to effect operation of the locomotive 10 in the direction in which the power cable is to be reeled in, then the contact 22 is operated to short circuit the portion 21' of the resistor 21. In this way the torque of motor 20 is increased so as to hold the power cable 12 taut and thereby minimize the danger of being run over by the locomotive. However, when the reversing controller 16' is operated to produce movement of the locomotive 10 in the opposite direction, the short circuit is removed from the portion 21' of the resistor 21 thereby decreasing the torque of motor 20. This facilitates free running of the power cable 12 without undue restraint from the torque motor 20.

What I claim as new and desire to secure by Letters Patent in the United States is:

1. In combination an electric motor driven vehicle having a reversing controller for selectively determining the direction of movement thereof, a cable reel for paying out and reeling in the power conductor for the vehicle upon corresponding movements thereof, an electric torque motor for the cable reel, torque regulating means for the cable reel motor, and electrical means associated with the said reversing controller for varying the action of said torque regulating means in accordance with the selective operation of the reversing controller to determine the direction of operation of the vehicle.

2. In combination an electric motor driven mining locomotive having a reversing controller for determining the direction of operation thereof, a cable reel for paying out and reeling in the power conductor for the locomotive upon corresponding movements thereof, an electric torque motor for the cable reel, a resistor in circuit with the cable reel motor, and contact mechanism associated with the locomotive reversing controller for short circuiting a portion of said resistor when the reversing controller is operated to effect operation of the locomotive in the direction to reel in said power conductors.

In witness whereof, I have hereunto set my hand this 16 day of Dec., 1930.

ARTHUR SHAFFER.